US010189638B2

(12) United States Patent
Catozzi et al.

(10) Patent No.: US 10,189,638 B2
(45) Date of Patent: Jan. 29, 2019

(54) EASY POURING PACKAGING POUCH

(71) Applicant: Amcor Flexibles Italia S.R.L., Lugo di Vicenza (IT)

(72) Inventors: Nicola Catozzi, Sandrigo (IT); Michel Cabanes, Yzosse (FR); Geoffroy Gruson, Amiens (FR); Anna Perez, Barcelona (ES); Andrea Della Torre, Busto Arsizio (IT)

(73) Assignee: Amcor Flexibles Italia S.R.L., Lugo di Vicenza (IT)

( * ) Notice: Subject to any disclaimer, the term of this patent is extended or adjusted under 35 U.S.C. 154(b) by 149 days.

(21) Appl. No.: 15/123,831

(22) PCT Filed: Mar. 2, 2015

(86) PCT No.: PCT/EP2015/054288
§ 371 (c)(1),
(2) Date: Sep. 6, 2016

(87) PCT Pub. No.: WO2015/132195
PCT Pub. Date: Sep. 11, 2015

(65) Prior Publication Data
US 2017/0174416 A1 Jun. 22, 2017

(30) Foreign Application Priority Data

Mar. 6, 2014 (EP) .................................... 14158076

(51) Int. Cl.
*B65D 85/72* (2006.01)
*B32B 1/02* (2006.01)
(Continued)

(52) U.S. Cl.
CPC .............. *B65D 85/72* (2013.01); *B32B 1/02* (2013.01); *B32B 27/00* (2013.01); *B32B 27/14* (2013.01);
(Continued)

(58) Field of Classification Search
CPC ...... B65D 33/01; B65D 75/008; B65D 75/26; B65D 75/30; B65D 77/225; B65D 85/70; B65D 85/72; B32B 1/02; B32B 1/08; B32B 27/14; B32B 27/18; B32B 27/20
See application file for complete search history.

(56) References Cited

U.S. PATENT DOCUMENTS 4,488,924 A * 12/1984 Krieg ..................... B32B 27/08
156/244.11
6,165,573 A 12/2000 Hirose et al.
(Continued)

FOREIGN PATENT DOCUMENTS

EP 2208604 A1 7/2010
EP 2487033 A1 8/2012
(Continued)

*Primary Examiner* — Walter Aughenbaugh
(74) *Attorney, Agent, or Firm* — Reinhart Boerner Van Deuren P.C.

(57) ABSTRACT

The present invention discloses a packaging pouch for a viscous content, the pouch comprising a flexible multilayer laminate, said laminate comprising an inner layer in contact, in use, with the content of said pouch, the pouch comprising a top region and a bottom region and one or more cross-seal(s), said pouch comprising a tearable venting means in the bottom region.

19 Claims, 6 Drawing Sheets

(51) Int. Cl.
  *B32B 27/14* (2006.01)
  *B32B 27/18* (2006.01)
  *B65D 75/30* (2006.01)
  *B65D 75/26* (2006.01)
  *B32B 27/20* (2006.01)
  *B65D 75/00* (2006.01)
  *B65D 77/22* (2006.01)
  *B32B 27/00* (2006.01)
  *B65D 33/01* (2006.01)
  *B65D 39/00* (2006.01)
  *B65D 85/00* (2006.01)

(52) U.S. Cl.
  CPC .............. *B32B 27/18* (2013.01); *B32B 27/20* (2013.01); *B65D 33/01* (2013.01); *B65D 39/00* (2013.01); *B65D 75/008* (2013.01); *B65D 75/26* (2013.01); *B65D 75/30* (2013.01); *B65D 77/225* (2013.01); *B65D 85/70* (2013.01); *B65D 2205/00* (2013.01)

(56) References Cited

U.S. PATENT DOCUMENTS

| | | | |
|---|---|---|---|
| 2005/0220376 A1* | 10/2005 | Tsukanome | B65D 75/26 383/109 |
| 2007/0179230 A1 | 8/2007 | Sperlich et al. | |
| 2008/0276571 A1 | 11/2008 | Cichowski | |
| 2008/0310776 A1 | 12/2008 | Turvey et al. | |
| 2009/0123094 A1* | 5/2009 | Kreymborg | B65D 33/01 383/103 |
| 2011/0236540 A1 | 9/2011 | Owensby et al. | |

FOREIGN PATENT DOCUMENTS

| | | |
|---|---|---|
| JP | 11178713 | 7/1999 |
| WO | WO 2004/050357 A1 | 6/2004 |
| WO | WO 2005/092609 A1 | 10/2005 |
| WO | WO 2008/075416 A1 | 6/2008 |
| WO | WO 2012/107181 A1 | 8/2012 |

\* cited by examiner

EASY POURING PACKAGING POUCH

FIELD OF THE INVENTION

The present invention relates to an easy pourable packaging pouch for packaging viscous matrix food for human or pet consumption. This type of packaging is usually made of a flexible multilayer film laminate subjected to a thermal treatment such as retort, pasteurisation or hot-filling under aseptic conditions.

STATE OF THE ART

One of the current market trends in packaging is convenience, which is driven by the growing number of ready meals for humans or pets packed in so-called packaging pouches. Those packaging pouches can be flexible flat/pillow or stand-up pouches.

Wet ready meals are often viscous and fatty matrixes that stick to the pouch walls, making it difficult for the user to completely empty the pouch after opening it. This is partly due to the fact that the inner wall of those pouches does not exhibit sufficient flow properties, but is also due to the vacuum created when the pouch is turned upside down.

WO 2012/107181 discloses a packaging pouch for viscous jelly matrix food having an inside polymer layer with improved flow properties. The polymer layer is based on a grafted polyolefin with acrylic copolymer backbone.

Documents EP 1 808 291, WO 2004/050357, WO 2005/092609 and EP 2 208 604 address similar problems and are all related to the improvement of flow properties of the inner layer of the packaging film for an improved pouring of viscous jelly matrix food.

AIM OF THE INVENTION

The aim of the present invention is to significantly improve the pouring speed of food contained in a pouch and to decrease the amount of residue left in the same after pouring.

SUMMARY OF THE INVENTION

The present invention discloses a packaging pouch for a viscous content, the pouch comprising a flexible multilayer laminate, said laminate comprising an inner layer in contact, in use, with the content of said pouch, the pouch comprising a top region and a bottom region and one or more cross-seal (s), said pouch comprising a tearable venting means in the bottom region.

The present invention further discloses at least one or a combination of the following features:
- the bottom region comprises a front side, a back side and a gusset, wherein said tearable venting means is positioned in said front side, back side or gusset;
- the tearable venting means is positioned in the gusset;
- the top region comprises an opening initiation, preferably a notch or a pre-cut;
- the tearable venting means is selected from the group comprising easy-to-open pre-cuts, tearable valves, labels, pull tabs and peelable seals;
- the packaging pouch is a flow pack;
- the inner layer has a surface tension that is lower than 24 mN/m, preferably lower than 20 mN/m according to DIN 55660;
- the inner layer has a surface roughness that is higher than 700 particles/mm$^2$, and a crest-to-crest difference greater than 6 microns, preferably a surface roughness higher than 800 particles/mm$^2$ and a crest-to-crest difference greater than 7 microns;
- the inner layer comprises one or more surface-active additives selected from the group consisting of zinc glycerol stearate, salt derivatives of stearic acid, such as zinc, magnesium, calcium, ethylene bistereamide, mono-diglycerides of fatty acids and polyglycerol of fatty acids, or combinations thereof, in a concentration from 0.1 to 10 wt %, preferably 1 to 5 wt %;
- the inner layer comprises silicon derivatives;
- the inner layer comprises organic or inorganic anti-block agents selected from the group consisting of lamellar talc, crystalline or amorphous silica, calcium carbonate and aluminum silicate or ashes in concentrations between 1 and 20%, preferably 1 to 10%;
- the inner layer comprises an embossed profile oriented in the pouring direction of the packaging.

KEY

1. Packaging pouch
2. Venting means
3. Cross seal
4. Front side
5. Back side
6. Gusset
7. Opening initiation of the top area

DETAILED DESCRIPTION OF THE INVENTION

Wet pet-food products and ready meals are often prepared as viscous and fatty matrix that can easily stuck to the pouch walls. The feeling of the user is that part of the product is lost or has to be squeezed out of the pack, the residual food content dirtying their hands or need a tool such as a spoon to get out of the pack.

The aim of the present invention is to improve the pouring speed of a pouch by combining a tearable venting means in the bottom area of the pouch and preferably a modified inner layer in contact with food.

The present invention discloses a pouch 1 (stand-up or pillow) with a means allowing air penetration in the bottom area before pouring in order to facilitate and speed up the food pouring process. Air penetration can be obtained by numerous venting means 2 of various kinds (see figures).

Examples of venting means are small cut/opening/valves in the gusset area and/or front and backside of the pack. Those openings have to be created in the bottom area of the pack before the pack is opened in the top area by means of a tear notch or any other opening initiation of this kind.

Opening means in front or back of the gusset improves the pouring rate and reduces the pouring standard deviation with respect to a pouch of the prior art. Air penetration in the gusset nevertheless is a preferred embodiment and shows high efficiency and low standard deviation.

Comparative tests have been performed under statistically evaluable conditions by turning upside down and waiting about 10 seconds in this position. Pouches with venting means additionally present a higher pouring speed that is not represented in the table.

The results of this test show that the standard deviation of a pouch without venting means is particularly high. The pouring rate globally varies between 40 and 80%, around an average of about 60%, which is clearly perceived as a problem by the user.

Pouches with venting means in the bottom area exhibit an average pouring rate around 80%, varying between 76 and 84%, and even between about 82 and 85% when the venting means is positioned in the bottom area of the pouch.

Comparative Trials

| Stand-up pouch with gusset | Average % poured | Standard deviation |
| --- | --- | --- |
| Standard Prior art pouch | 61.1% | 23.7 |
| Cut (venting) in front and back side of the pouch | 79.3% | 4.3 |
| Cut in the gusset area of the pouch | 83.7% | 1.8 |

The effectiveness of the pouring is enhanced by combining the above-described air penetration by venting means with a modified inner layer in contact with the food. The inside layer of prior art pouches in contact with the food are typically polypropylene or polyethylene based sealant layer. Non-limitative examples are polypropylene resins as block-copolymer, homopolymer, random co-polymer, PP terpolymers or combinations thereof as well as polyethylene resins such as HDPE, LDPE, LLDPE, metallocene, polar polyethylene copolymer such as EVA, EMA or combinations thereof.

The inner layer of the pouch are produced by means of blown or cast technology such as non-oriented or mono/biaxial oriented polymer films. During this production process, various additives can optionally be added. Among those additives, anti-block agents, anti-fog agents, slipping agents, anti-oxidants, inert fillers . . . .

In a first embodiment of the present invention, the inside seal layer is modified by surface-active molecules in order to obtain good flowing properties of the product.

Possible surface-active molecules used for the sealant layer of the packaging of the present invention are zinc glycerol stearate, salt derivatives of stearic acid in general, such as zinc, magnesium, calcium, ethylene bistereamide, mono-diglycerides of fatty acids, polyglycerol of fatty acids, or combination thereof, most preferably in a concentration from 0.1 to 10 wt %, preferably 1 to 5 wt %. These types of molecules have the effect of capturing an extremely thin layer of water on the surface of the film (in the range of a few angstroms). This micro-layer of water will increase the sliding speed of the food content, thereby enhancing the pouring rate (see Example 2).

In a second embodiment of the invention, the pouring rate given by tearable venting means in the bottom area is enhanced by the addition of silicon derivatives in the sealant layer as described in WO 2012/107181, which will have the effect to lower the surface tension below 20 mN/m, most preferably below 14 mN/m, measured according to the contact angle method (similar to DIN 55660) and calculated by the Ownes-Wendt-Rabel-Kaeble-method.

A low surface tension decreases the interaction between food and inside layer increasing the pouring speed and diminishing the residue left in the pack (see Example 1).

Figure 1:
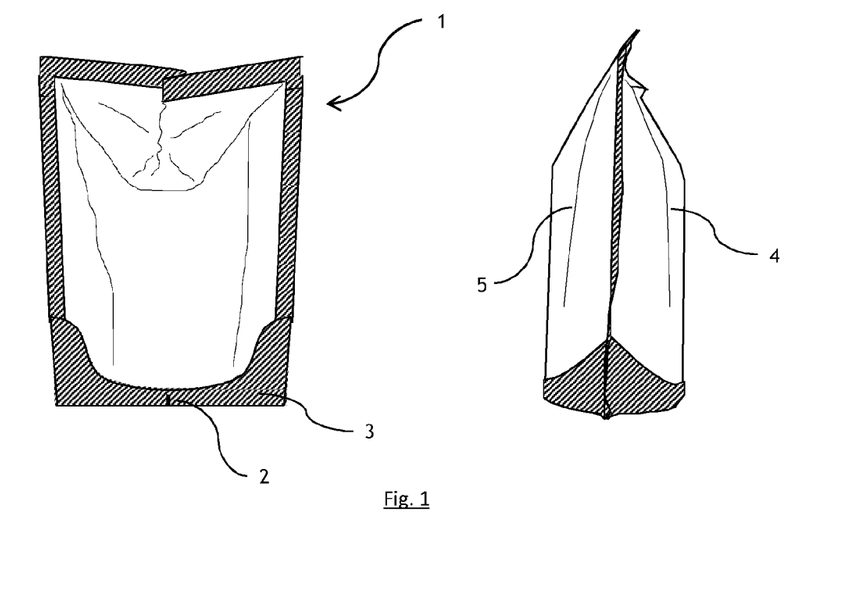
FIG. 1 shows a stand-up pouch comprising a venting means in its front side that has to be opened first before the top is completely opened by means of an opening aid.
Figure 2:
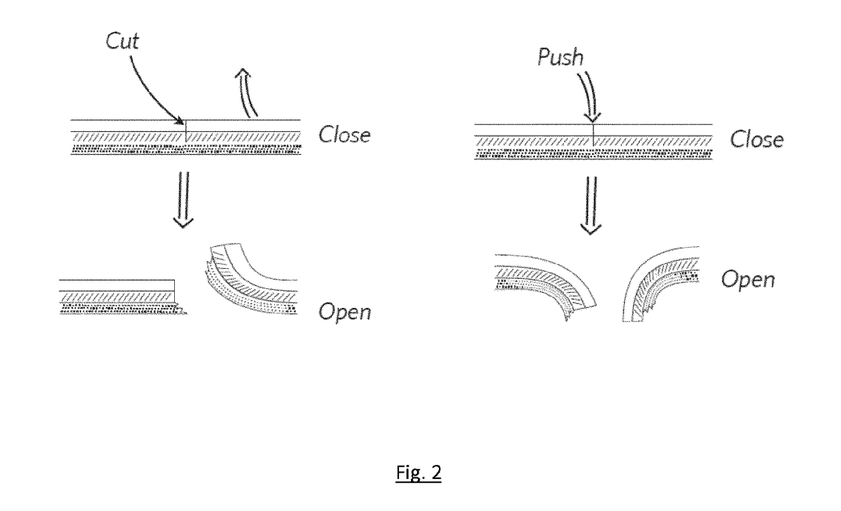
FIG. 2 shows an opening mechanism by means of a pre-cut that can be opened by pushing or tearing.
Figure 3:
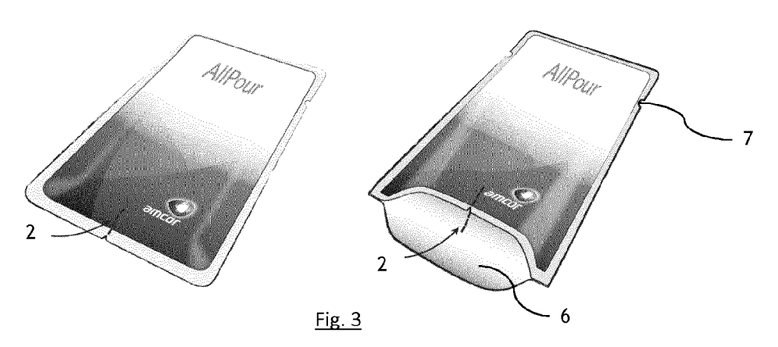
FIGS. 3, 4 and 5 show examples of various positions of the pre-cut mechanism shown in FIG. 2 on pillow pouches and stand-up pouches.
Figure 4:
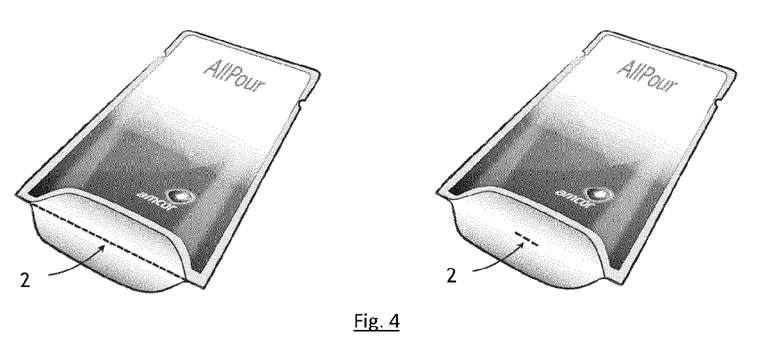
Figure 5:
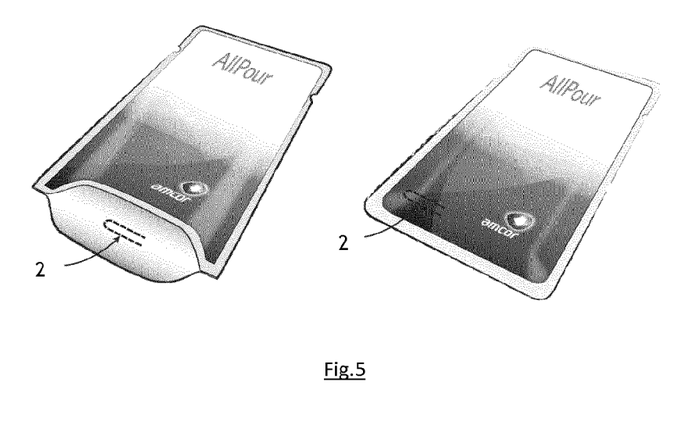
Figure 6:
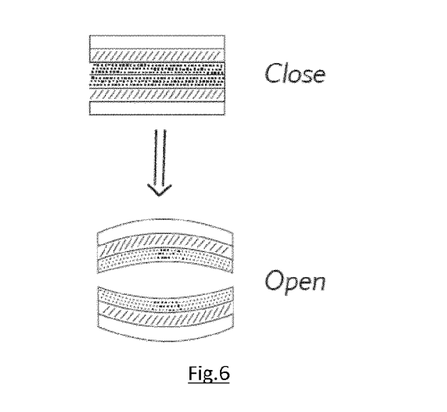
FIG. 6 shows an opening mechanism by means of a peelable seal.
Figure 7:
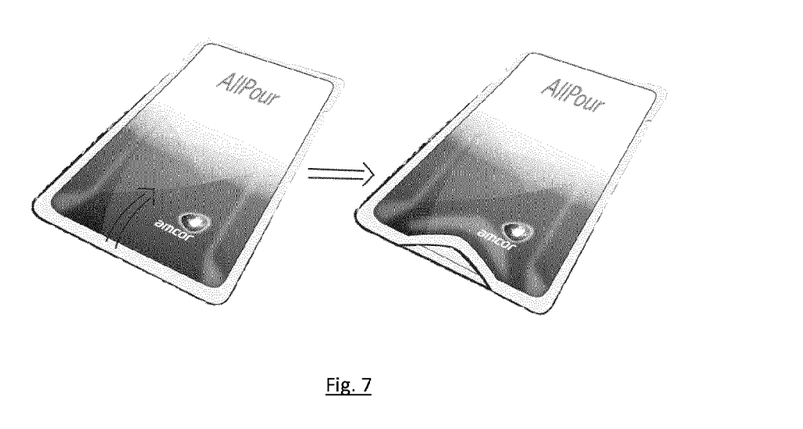
FIGS. 7 and 8 show the opening mechanism by means of a peelable seal on various types of pouches and in various positions.
Figure 8:
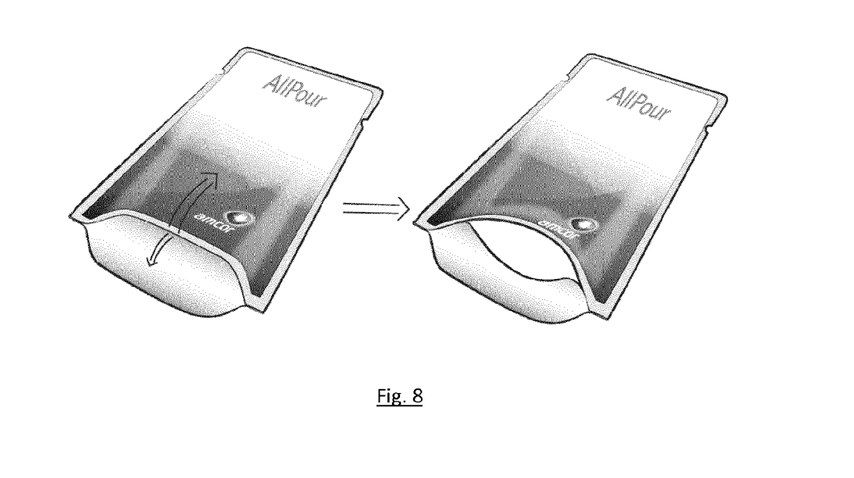
Figure 9:
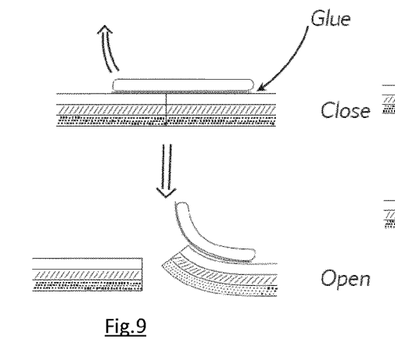
FIGS. 9 and 10 show an opening mechanism by means of a label that can be a cold seal label, a peelable sealed label or an adhesive label. One, two or even more venting holes can be opened in this way.
Figure 10:
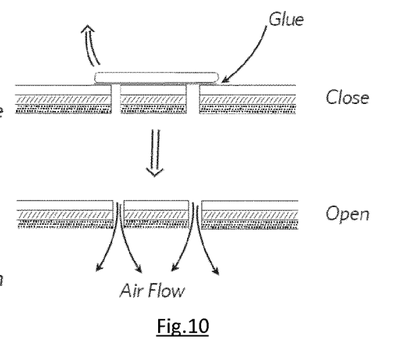
Figure 11:
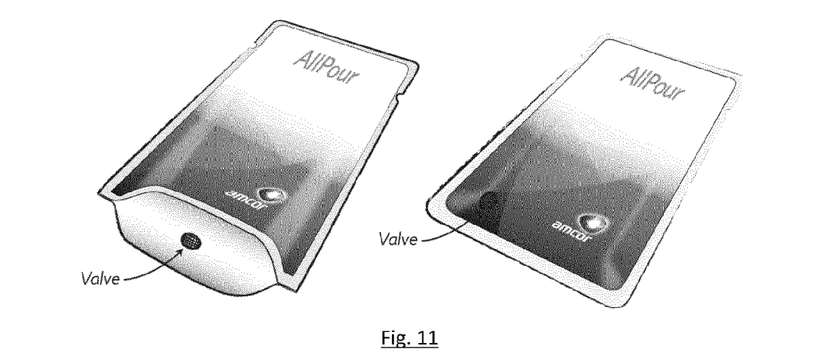
FIG. 11 shows a valve as venting means in the bottom area.
Figure 12:
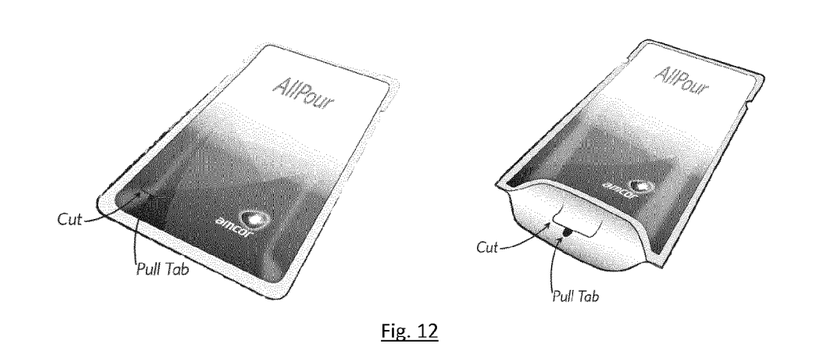
FIG. 12 shows a pull tab as venting means in the bottom area.
Figure 13:
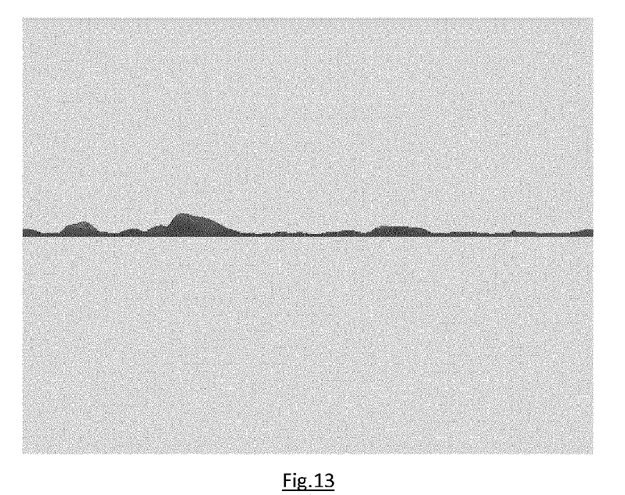
FIGS. 13 and 14 show two different surface roughnesses of the inner layer.
Figure 14:
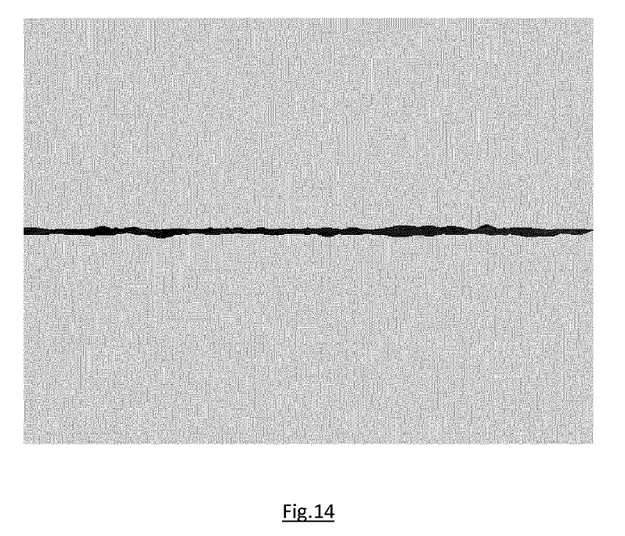
Figure 15:
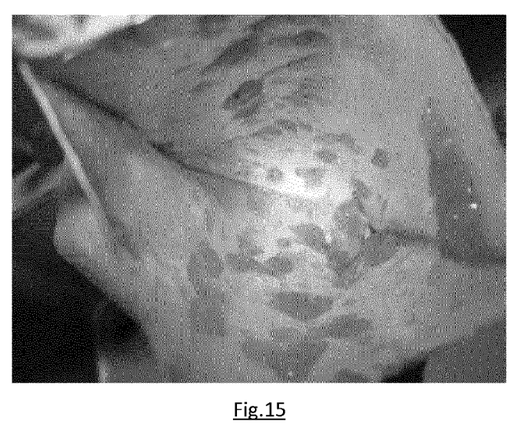
FIG. 15 shows a pack of the prior art after pouring.
Figure 16:
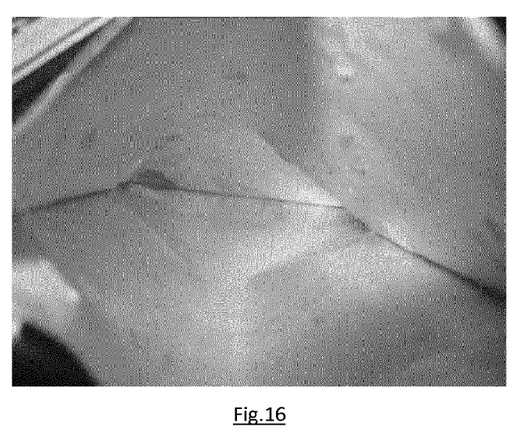
FIG. 16 shows a pack according to the invention after pouring.
Figure 17:
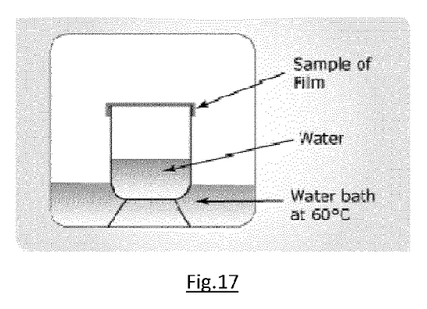
FIG. 17 shows equipment for anti-fog test.

In a third embodiment of the present invention, the surface-food interaction inside the pouch is decreased by reducing the roughness of the inner sealant layer by means of organic or inorganic anti-block agents like: lamellar talc, crystalline or amorphous silica, calcium carbonate, aluminum silicate or ashes, PMMA, SBC, . . . . These additives can be used in concentrations between 1 and 20%, preferably 1 to 10%. The surface roughness will vary from 133 particles/mm$^2$ as common in prior art (see FIG. 13) to 2000 particles/mm$^2$ (see FIG. 14), most preferable situation with a crest-to-crest difference of more than 6.8 micron as evaluated by a calibrated microscope measurement (magnification 50×, resolution 0.07 microns/pixel, 2560×1920). Said changing in morphology will have the effect of diminishing contact surface between food and inner pouch walls supporting the easy flowing of the content (see Example 3).

In a fourth embodiment of the present invention, the surface-food interaction inside the pouch is decreased by reducing the surface roughness of the inner surface by means of a grooved or engraved chill roll leading to a modified surface. Preferably, the grooved surface will be done in transverse direction of the film, which represents the length of the pouches and so the direction for pouring. The dimension and shape can be adapted to the viscosity of the different food packaged. The change in surface roughness can be obtained by bars for enduction in a depth of 4 to 500 µm.

The effects of the previous embodiments of the present invention can be combined to the tearable venting means. Preferred combinations are additives creating water filming layer such as glycerol monostearate and morphology modifications given by silica dioxide (see Example 4).

Examples of Multilayer Laminates that can be Used for the Pouch of the Present Invention barrier polyester PET (aluminium oxide coated, silicon oxide coated, organic barrier coating) from 8 to 36 micron/polyamide PA from 10 to 15 micron/polypropylene PP, polyethylene PE from 30 to 100 micron polyester PET from 8 to 36 micron/barrier polyester PET (aluminium oxide coated, silicon oxide coated, organic barrier coating) from 8 to 36 micron/polypropylene PP, polyethylene PE from 30 to 100 micron polyester PET from 8 to 36 micron/aluminium from 4 to 10 micron/polypropylene PP, polyethylene PE from 30 to 100 micron polyester/barrier polyamide (aluminium oxide coated, silicon oxide coated, organic barrier coating)/polypropylene PP, polyethylene PE barrier polyester PET (aluminium oxide coated, silicon oxide coated, organic barrier coating)/polypropylene PP, polyethylene PE barrier polyamide PA (aluminium oxide coated, silicon oxide coated, organic barrier coating)/polypropylene PP, polyethylene PE polyester PET from 8 to 36 micron/aluminium from 4 to 10 micron/polyamide PA from 8 to 20 microns/polypropylene PP, polyethylene PE from 30 to 100 micron

EXAMPLES AND TESTS OF ADDITIVES IN THE SEALANT LAYER

The starting point for the comparative tests was the following reference laminate structure: PET 12 μm/PU adhesive 5 g/m²/ALU 8 μm/PU adhesive 3 g/m²/PP 60 μm The tested additives are located in the sealant polypropylene layer in contact with the food, wherein PET is biaxially-oriented transparent polyester terephthalate, the adhesive is a polyurethane solvent based retort stable adhesive (Dow 811+catalyst 9L10), ALU is a soft temper aluminium foil and PP is a block-copolymer resin (Total PPC3660).

Example 1—Siloxane—Surface Low Wettability

PP 60 μm containing 5% w/w MB50-001 (as 50% dispersion of methyl siloxane in PP copolymer) from Dow Corning.

Example 2—Glycerol Monostearate—Water Filming Concept

PP 60 μm containing 10% w/w 40390 masterbatch (as 10% dispersion of glycerol monostearate dispersed in PP copolymer) from Ampacet.

Example 3—Inorganic Antislip—Surface Roughness

PP 60 μm containing 5% w/w Polyfort® E 17338 (as 22% calcium carbonate filled polypropylene copolymer) from Shulman.

Example 4—Combination: Water Filming Concept+Surface Roughness

PP 60 μm containing 10% w/w 40390 masterbatch (as 10% dispersion of glycerol monostearate dispersed in PP copolymer) from Ampacet and 5% w/w M65 (as 65% natural amorphous silica topcut 30 mic on LDPE carrier) from Shulman.

| Example | Roughness Particles/mm² | Surface tension mN/m | Contact angle Water (deg.) | Contact angle Diiodomethane (deg.) | Anti-fog effect Rating A-E |
|---|---|---|---|---|---|
| Reference | 133 | 28.3 | 107 | 61 | B |
| 1 (Siloxane) | 140 | 14 | 109 | 84 | C |
| 2 (GMS) | 130 | 27.8 | 103 | 62 | D |
| 3 (CaCO3) | 1770 | 27.7 | 106 | 61 | B |
| 4 (CaCO3 + GMS) | 845 | 25.8 | 106 | 65 | D/E |

Parameters

Roughness: pictures were taken via a calibrated lens on a microscope with 3D reconstruction (magnification 50×, resolution 0.07 microns/pixel, 2560×1920)

Surface tension: for the calculation of the surface tension IFT (polar and disperse part) the Owens-Rabel Kaeble-method was used Contact Angle: measured according to DIN 55660. The contact angles were measured four times with water and diiodmethan. The error of the optical resolution is 0.1 degree.

Anti-fog effect method and rating used: reference test ASTM D2578-99a

Example 1 shows a low surface tension (14 mN/m), Example 2 shows a large anti-fog effect (D), Example 3 shows a low roughness (1770 particles/mm²) and Example 4 shows a low roughness and a large anti-fog effect.

As mentioned above, polyolefin films can be modified with organic additives based on OH functionalities like: glycerol, glycerol monostearate, mono and diglyceride derivates, ethoxylated alkyl amine. The purpose of such additives is the capture of humidity and to create a very thin layer of water. In polyethylene films, such additives exhibit a fast migration to the surface with orientation of the —OH function to the external medium and classical means of control are possible via surface resistivity

IRFT ATR H anti-fog effect in hot and/or cold conditions

With polypropylene, the crystallinity and cooling speed are such that the –OH functions are naturally oriented to the most polar medium, which is normally the corona-treated side or adhesive layers, therefore their rotation could be difficult due to molecular overcrowding. As a consequence, it is not always possible to easily detect additive presence on the sealing surface, nor to see their effectiveness by one of the surface resistivity or IRFT method.

The measurement of the anti-fog effect under hot and/or cold conditions is therefore necessary to qualify the effects of some of those additives, in particular on polypropylene sealant layer.

Experimental Determination of the Anti-Fog Effect

A glass is filled with hot water (around 60° C.) and hermetically closed. The glass is exposed in an oven during one hour at a temperature between 60 to 80°. After one hour, the film is submitted to ambient conditions and observation is made after one hour of stabilization. Immediately after the opening of the oven, no difference is observable between the polymer film comprising GMS and the reference film. After the stabilization, the polymer film comprising GMS exhibits a large anti-fog effect while the reference polymer film exhibits many droplets and is not transparent. When the formation of droplets on the film is effective, it is possible to put the samples again in the oven for 30 minutes to accelerate the molecule orientation. By means of this test, it is possible to control by comparison the effectiveness of organic additives OH based in PP film while no classical means such as surface resistivity shows a measurable difference. The same test can also be used for polyolefin films.

| | Description | | |
|---|---|---|---|
| An opaque layer of small fog droplets | Very poor | A | Zero visibility |
| An opaque transparent layer of large droplets | Poor | B | Zero visibility, poor light transmission |
| A complete layer of large transparent drops | Poor | B/C | Poor visibility, lens effect, dripping |
| Randomly scattered or large transparent drops | Good | D | Discontinuous film of water |
| Transparent film displaying no visible water | Excellent | E | Completely transparent |

The invention claimed is:

1. Packaging pouch for a viscous content, the pouch comprising a flexible multilayer laminate, said laminate comprising an inner layer in contact, in use, with the content of said pouch, the pouch comprising a top region and a bottom region and one or more cross-seal(s), said pouch comprising a tearable venting means in the bottom region, allowing the penetration of air behind the viscous content to remove the vacuum, when the pouch is turned upside down, in order to improve the pouring speed of food contained in the pouch and to decrease the amount of residue left in said pouch after pouring.

2. Packaging pouch according to claim 1, comprising in the bottom region a front side, a back side and a gusset, wherein said tearable venting means is positioned in said front side, back side or gusset.

3. Packaging pouch according to claim 2, wherein the tearable venting means situated in the front side or in the back side are located in the bottom quarter of the pouch.

4. Packaging pouch according to claim 1, wherein said tearable venting means is positioned in a gusset.

5. Packaging pouch according to claim 1, wherein the top region comprises an opening initiation.

6. Packaging pouch according to claim 1, wherein the tearable venting means is selected from the group comprising easy to open pre-cuts, tearable valves, labels, pull tabs and peelable seals.

7. Packaging pouch according to claim 1, wherein said pouch is a flow pack.

8. Packaging pouch according to claim 1, wherein the inner layer has a surface tension lower than 24 mN/m according to DIN 55660.

9. Packaging pouch according to claim 1, wherein the inner layer has a surface roughness of higher than 700 particles/mm$^2$, and a crest-to-crest difference greater than 6 microns.

10. Packaging pouch according to claim 1, wherein the inner layer comprises one or more surface-active additives selected from the group consisting of zinc glycerol stearate, and salt derivatives of stearic acid, in a concentration from 0.1 to 10 wt %.

11. Packaging pouch according to claim 1, wherein the inner layer comprises silicon derivatives.

12. Packaging pouch according to claim 1, wherein the inner layer comprises organic or inorganic anti-block agents selected from the group consisting of lamellar talc, crystalline or amorphous silica, calcium carbonate and aluminum silicate or ashes, said organic or inorganic anti-block agents being in concentrations between 1 and 20%.

13. Packaging pouch according to claim 1, wherein the inner layer comprises an embossed profile oriented parallel to the pouring direction of the packaging.

14. Packaging pouch according to claim 5, wherein the opening initiation is a notch or a pre-cut.

15. Packaging pouch according to claim 8, wherein the inner layer has a surface tension lower than 20 mN/m according to DIN 55660.

16. Packaging pouch according to claim 1, wherein the inner layer has a surface roughness of higher than 800 particles/mm$^2$, and a crest-to-crest difference greater than 7 microns.

17. Packaging pouch according to claim 10, wherein the salt derivatives of stearic acid are at least one from the group consisting of zinc, magnesium, calcium, ethylene bistereamide, mono-diglycerides of fatty acids and polyglycerol of fatty acids, or combinations thereof.

18. Packaging pouch according to claim 10, wherein the one or more surface-active additives are in a concentration from 1 to 5 wt %.

19. Packaging pouch according to claim 12, wherein the organic or inorganic anti-block agents are in concentrations between 1 to 10%.

* * * * *